Dec. 18, 1934.  R. G. BIRR  1,984,724
MACHINE FOR MAKING FROZEN CONFECTIONS
Filed March 25, 1933  3 Sheets-Sheet 1
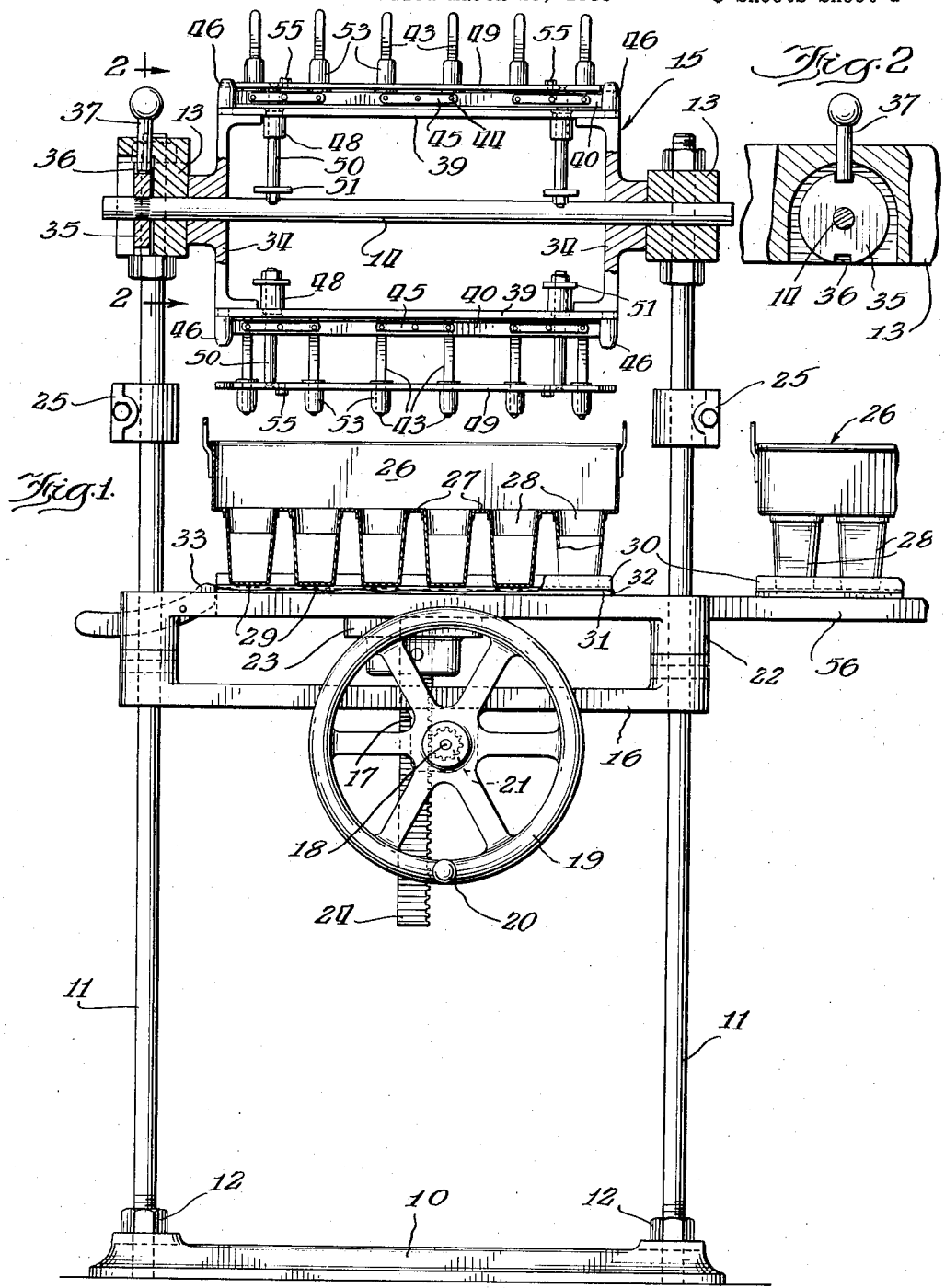

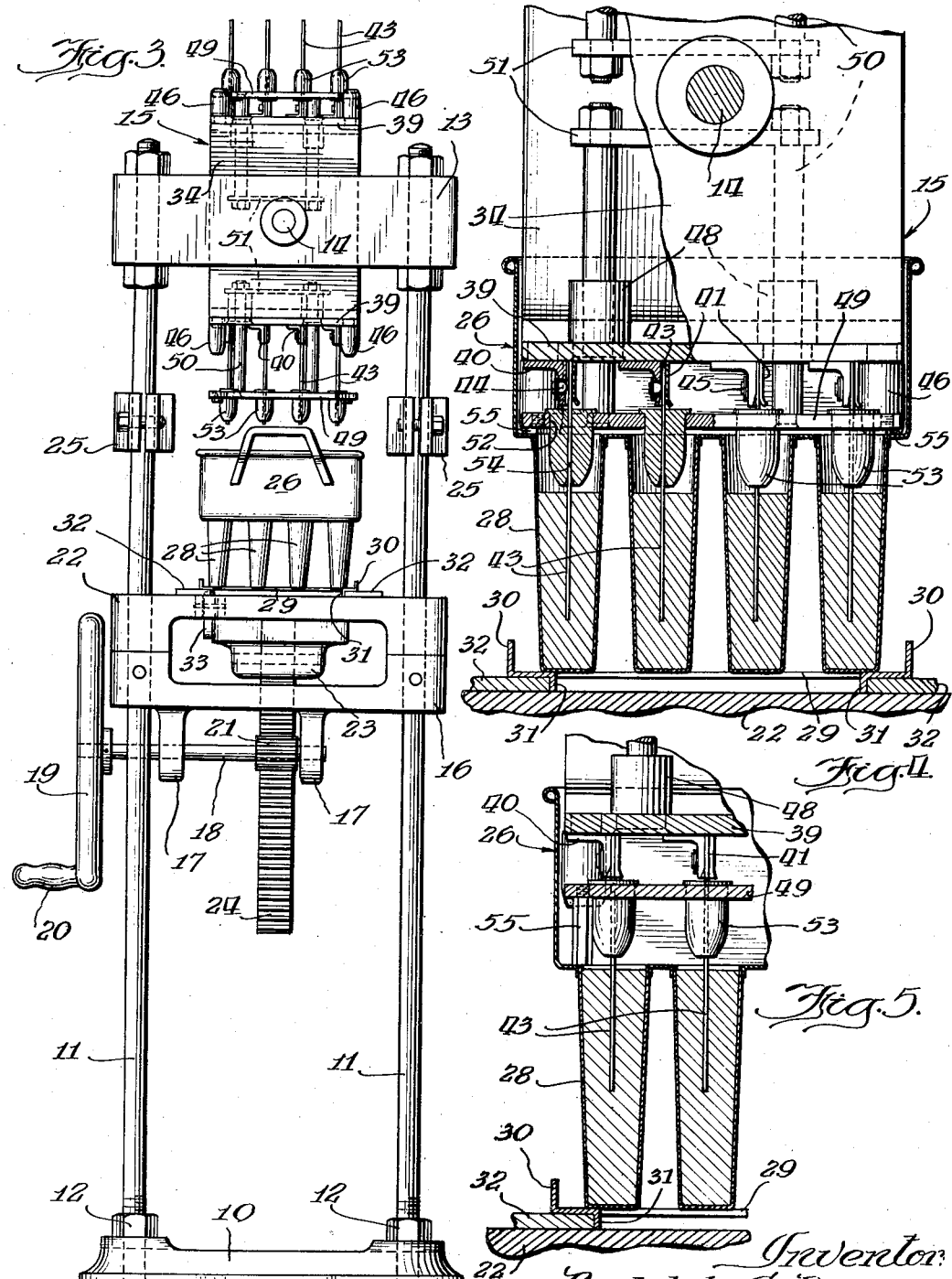

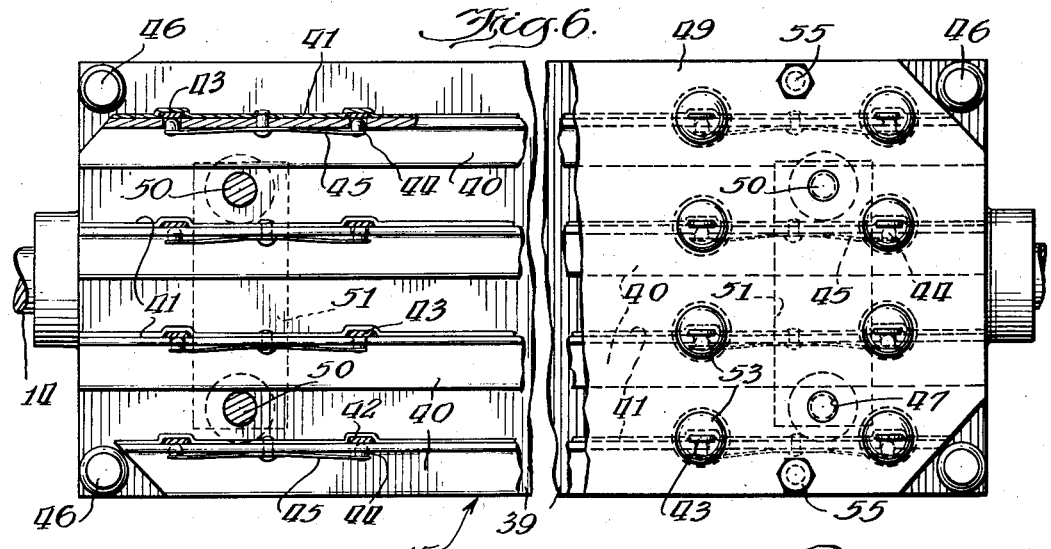
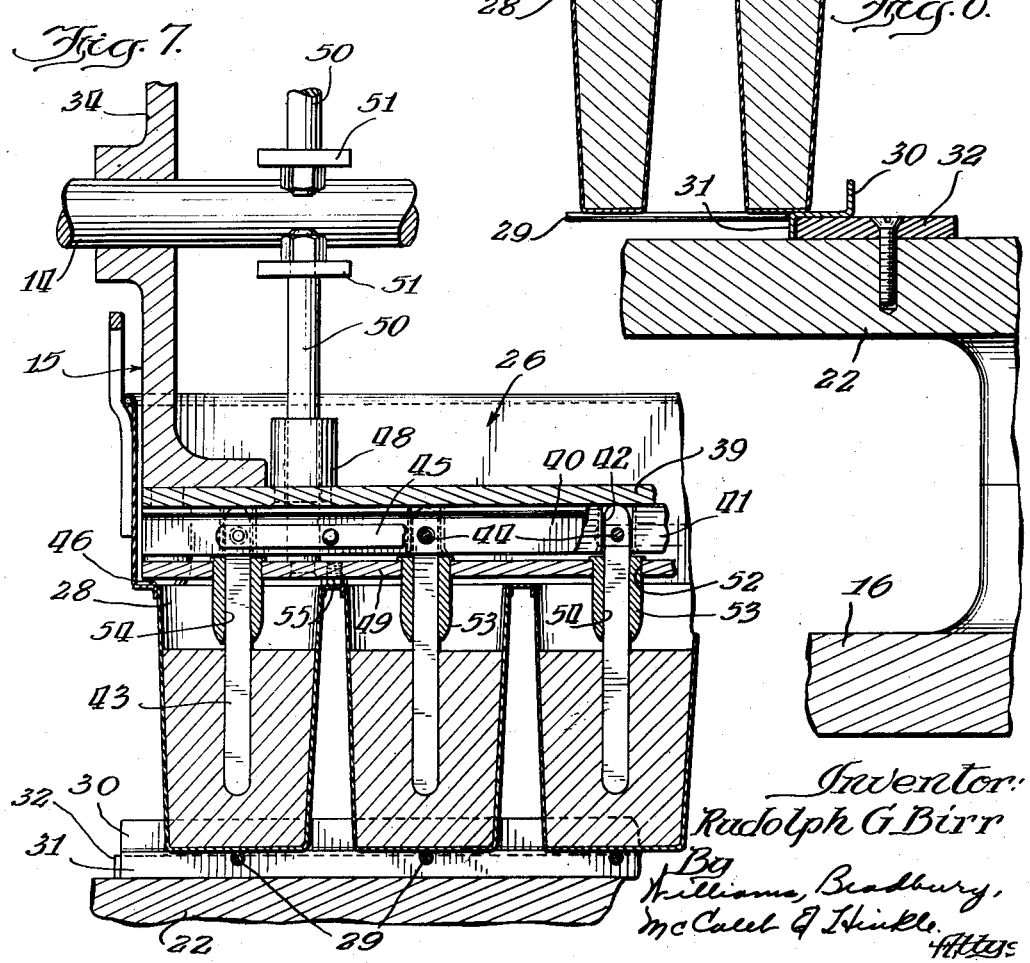

Patented Dec. 18, 1934

1,984,724

UNITED STATES PATENT OFFICE 1,984,724

MACHINE FOR MAKING FROZEN CONFECTIONS

Rudolph G. Birr, Lombard, Ill., assignor to Precision Metal Workers, Chicago, Ill., a corporation of Illinois Application March 25, 1933, Serial No. 662,706

13 Claims. (Cl. 107—8)

This invention relates to a machine for making frozen confections of the type in which the frozen confection is provided with a stick which serves as a handle, the stick being imbedded in the frozen confection. The invention is applicable to frozen confections of all kinds, including confections of both the ice-cream type and water-ice type.

I have discovered that such sticks or other rigid handles can very readily be inserted into the frozen confection by merely presenting them thereto and applying force in a longitudinal direction. In certain cases the stick—particularly flat sticks—will bend or buckle, which is objectionable since the stick may be broken and, further, the opening made in the frozen confection is too large. I have found that the stick thus inserted is firmly imbedded in the frozen confection without the necessity of subsequent freezing, and that the confections may be lifted and transported by means of the sticks, immediately after the sticks are inserted.

The improved machine of my invention is adapted to force the stick into the frozen confection while the same is in a mold. During this insertion the machine provides support for the stick adjacent its point of entry into the frozen confection and at an intermediate position to prevent buckling. Thereafter the mold is defrosted so as to release the frozen confection therefrom and the frozen confection is withdrawn by means of the stick. Thereafter the frozen confection may be chocolate coated and wrapped or otherwise finished in a manner well known in the art.

My machine is adapted for operation in this way rapidly and expeditiously, with the production of a large number of confections simultaneously.

The invention will be readily understood from the following description of a preferred embodiment of this machine and the manner in which it operates, with reference to the accompanying drawings, in which Figure 1 is a front elevation of the machine in initial operating position, the mold being shown on the table in section and parts of the machine being shown in section;

Fig. 2 is a sectional detail view on the line 2—2 of Fig. 1;

Fig. 3 is an end elevation of the machine;

Fig. 4 is an end view of the head in cooperative relation with the mold, the mold and part of the head being shown in section;

Fig. 5 is a fragmentary sectional view similar to Fig. 4, showing the manner in which the machine is adapted for larger confections;

Fig. 6 is a plan view of the head filled with sticks, part of the upper plate being broken away and parts of the head being shown in section;

Fig. 7 is a fragmentary front sectional elevation corresponding to Fig. 4; and

Fig. 8 is a sectional detail view showing the relation of the mold and table.

Referring to the drawings, the machine comprises a base plate 10 and four vertical corner posts 11 which are threaded into the base and secured thereto by means of lock-nuts 12. The posts 11 at each end of the machine are connected at their upper ends by means of bridge-pieces 13 which provide bearings for a shaft 14 which rotatably supports a head 15 which will be hereinafter more fully described. At an intermediate position a table 16 is pinned to the corner posts 11. This table carries depending lugs 17 which provide bearings for an actuating shaft 18. The shaft 18 projects outwardly in front of the machine and has rigidly mounted thereon a wheel 19 provided with a handle 20. Near its inner end the shaft 18 is provided with a pinion 21 rigidly mounted on said shaft.

Above the table 16 is mounted a movable table 22 which is adapted to slide vertically on the posts 11, said posts passing through elongated openings in bosses at the corners of the table 22. On its under side the table 22 is provided with a boss 23 which receives the upper end of a rack-bar 24, the rack-bar being pinned to the boss 23 or otherwise rigidly secured thereto. The rack-bar 24 is in mesh with the pinion 21 so that when the wheel 19 is rotated, the table 22 is elevated or lowered in accordance with the direction of rotation.

Collars 25 are mounted on the posts 11 to serve as stops for limiting the upward movement of the table 22. These stops are adjustable in position so as to adapt the machine for use with confections of different size, as will hereinafter be explained.

The machine is adapted to receive and cooperate with a multiple mold 26 which comprises an upper dish portion, the bottom of which is a flat sheet 27. The sheet 27 is provided with a large number of openings, twenty-four being provided in the embodiment shown. Into each opening is secured a mold pocket 28 which extends below the sheet 27. These pockets preferably taper downwardly so as to provide draft for the ready withdrawal of the frozen confections. The pockets 28 are arranged in both longitudinal and transverse rows in a regular manner.

Transverse rods 29 extend across the mold, each rod 29 being spot-welded or otherwise secured to the under side of a transverse row of mold pockets. The rods 29 are rigidly secured to runners 30 which extend longitudinally of the mold 26 at opposite sides thereof. The runners 30 are of Z cross-section, and the end webs 31 project downwardly so as to engage the surface on which the mold is placed.

The flanges 31 are adapted to cooperate with rails 32 mounted on the upper surface of the table 22 so as to insure the correct alignment in the transverse direction of the mold 26 with respect to the head 15. In order to insure correct positioning in the longitudinal direction, the table 22 is provided with a pivoted stop 33 which is adapted to engage the mold 26 at a suitable point, for example, at the end of one of the runners 30.

As seen in Fig. 1, the stop 33 is located on the left, and in this case the mold 26 is fed to the left. If the direction of movement of the molds 26 in the course of manufacture were to the right, the stop 33 would preferably be located on the right-hand side. It will readily be understood that after the machine has performed its operation, the stop 33 is depressed by elevating its free end, and the mold 26 is moved to the left.

The head 15 will now be described in greater detail. This head comprises end members 34 which are rigidly mounted on the shaft 14. The shaft 14 projects through one of the bars 13, for example, the left-hand bar, as viewed in Fig. 1, and has rigidly mounted thereon a ratchet disk 35 which is located in a recess in the bar 13. The ratchet disk 35 is provided with recesses 36 which are of the same number as the effective faces of the head 15, as will be readily understood from the following description. In the present embodiment two such faces are provided, but it will readily be understood that three or a greater number may be provided if desired.

A pin 37 is adapted to extend into one of the openings 36 and hold the head 15 against rotation for the time being. This pin 37 is suitably carried in an opening in an overhanging part of the bar 13. When it is desired to rotate the head to a new position, the pin 37 is elevated out of the recess 36 and the head is rotated until the pin falls into the next recess 36.

The end members 34 have rigidly secured thereto plates 39, one for each operative position of the head 15. Each plate has secured thereto longitudinally directed angle bars 40, each bar corresponding to one of the longitudinal rows of mold pockets 28. To the outer face of the outwardly directed flange of each angle bar 40 is riveted or otherwise suitably secured a strap of metal 41. Each strap 41 is bent or deformed at six places along its length so as to provide pockets 42 which are adapted to receive sticks 43 which are to be pressed into frozen confections. The straps 41 and the angles 40 are bent and cut away, respectively, at their outer edges adjacent the pockets 42 so as to provide these pockets with flaring outer ends, the more readily to adapt them to receive the sticks 43.

The sticks 43 have a free fit in the openings 42 and are resiliently held therein by spring pressed projections 44 carried at the ends of springs 45. The springs 45 are secured to the angle bars 40 on the opposite side thereof from the straps 41. Both the straps 41 and the springs 45 may be secured to the angle member 40 by means of the same rivets. Each spring 45 cooperates with two pockets 42, being mounted at the center upon the angle bar 40 and carrying the projections 44 at its extremities.

The projections 44 extend through openings in the angle bar 40 into the pockets 42. They have rounded ends so that when sticks are pressed into pockets 42, the projections 44 are pressed outwardly and thereafter are forced by the resilience of the spring 45 against the sticks 43 so as to hold them in position for the time being.

At each corner of the plate 39 I provide an outwardly directed pin 46 of substantial dimensions and provided with rounded outer ends. The function of these pins will hereinafter be described. The plate 39 is provided with four openings 47, and bushings 48 are mounted on the inner side of the plate 39 in alignment with these openings.

On the outer side of each plate 39 and in spaced relation thereto, I mount a plate 49 which is movable relative to the plate 39. The plate 49 carries four inwardly directed bolts 50 which project through the bushings 48 to the inner side of the plate 39. Transverse bars 51 connect the ends of each pair of bolts 50 together, the bars being secured to the bolts 50 by means of nuts at their extremities.

Considering one of the plates 49 in its upper position, that is, for example, the uppermost plate 49, as seen in Fig. 1, the bars 51 are in spaced relation with respect to the inner ends of the bushings 48. The distance between these elements defines the degree of movement permitted to the plate 49.

The plate 49 is provided with circular openings 52 in alignment with the pockets 42. These openings 52 receive guide members 53 which are rigidly secured to the plate 49 and are provided with openings 54 which are substantially similar to the pockets 42 and are adapted to receive the sticks 43 with a guided fitting. These openings 54 are in alignment with the pockets 42.

On the outer face of the plate 49 I mount spacing members 55 which are adapted to engage the intermediate flat sheet 27 of the mold 26 and thus define the degree of entry of the guide members 53 into the mold pockets 28. This degree of entry should be varied in accordance with the size of the frozen confection in the mold pocket.

In Fig. 4 I have shown a relatively short spacing member 55 which permits the guide member 53 to enter into the mold pocket to a considerable degree. In Fig. 5 I have shown a longer spacing member 55 adapted for use with a larger confection. The spacing members 55 may suitably consist of lengths of hexagonal stock, the inner ends of which are threaded so that they may conveniently be screwed into suitably threaded openings in the plate 49. The corners of the plate 49 are cut away in order to clear pins 46.

The operation is as follows: A mold 26, in the pockets of which a suitable amount of confection material has been frozen, is supplied to a table 56 in alignment with the table 22 in its lowermost position. The mold 26 is slid onto the table 22, its runners 30 engaging the rails 32 on the table surface. The mold 26 is arrested by the stop 33. At this time another operator feeds sticks 43 into the openings 54 of the guide members 53 on the upper side of the head 15.

The sticks are forced inwardly until their ends project into the pockets 42 and they are engaged by the spring-pressed projections 44 in the manner described above. When all of the openings 54 have received sticks, the pin 37 is elevated and the head 15 is rotated so as to bring these sticks into operative position above the mold 26.

The pin 37 retains the head 15 in this position, in which each stick 43 is directly above the vertical center of a mold pocket 28. When the head is thus rotated, the plate 49 falls outwardly to its lowermost position as defined by the engagement of the bars 51 with the inner ends of the bushings 48. When this occurs the sticks 43 are supported both at the ends which are within the pockets 42 and adjacent the ends which are presented to the confections and along a substantial length defined by the guide members 53.

The wheel 19 is then rotated so as to elevate the table 22 and cause the frozen confections within the mold pockets 28 to be presented to the downwardly directed sticks 43. As this movement continues, the side walls of the upper dish portion of the mold 26 approach the downwardly directed corner pins 46 and, if any slight misalignment between the head of the mold is present, the pins 46 will correct it. At this time the plate 49 and the guide members 53 are within the dish portion, the latter members approaching the surface of the frozen confections within the pockets and the lower ends of the sticks 43 projecting slightly beyond the guide members 53. When the guide members 53 are slightly above the frozen confections, the plate 49 is arrested by the engagement of the spacer elements 55 with the flat intermediate sheet 27 of the mold 26, these spacing members being selected of appropriate length so that the guide members 53 do not make contact with the frozen confections.

Continued movement carries the plate 49 and the guide members 53 upwardly and at this time the sticks 43 are being forced into the frozen confection and are guided and supported against buckling at the point of entry of the stick into the frozen confection and along a substantial length of the stick thereabove by the guide member 53. The upward movement of the table 22 is terminated by its contact with the collars 25. These collars are preferably adjusted so that the same exposed length of handle is left in all cases, irrespective of the size of the frozen confection.

I have found that sticks or handles thus imbedded in the frozen confection are firmly held therein. Thus, on reversal of the wheel 19, the table 22 and mold 26 are lowered and the sticks 43 are withdrawn from the guide members 53 and the pockets 42. When the table returns to its initial position, the stop 33 is manipulated and the mold 26 is moved to the left. At this time the first operator is busy inserting sticks into the openings 54 in the uppermost face of the head in preparation for a repeated operation. Thereafter the mold 26 is subjected to defrosting by having its pockets 28 immersed in water, and the frozen confections may be removed by means of the exposed sticks or handles 43.

Although the invention has been described in connection with specific details of a preferred embodiment thereof, it must be understood that such details are not intended to be limitative of the invention except in so far as set forth in the accompanying claims.

Having thus described my invention, what I claim as new and desire to secure by United States Letters Patent is:

1. A machine for making frozen confections which comprises a table adapted to receive a mold containing a frozen confection, a head adapted to receive and support one end of a handle with the other end presented towards the confection, means for causing relative movement between the table and head to cause the handle to be thrust into the confection, and guide means mounted on the head for free movement in the longitudinal direction of the handle and adapted to engage and guide the handle adjacent the confection.

2. A machine for making frozen confections which comprises a table adapted to receive a mold containing a frozen confection, a rotatable head adapted to receive a handle and having resilient means adapted to hold the handle yieldable therein, said head being adapted to hold the handle presented towards the confection, and means for causing relative movement between the table and head to cause the handle to be thrust into the confection and for causing relative movement in the opposite direction to withdraw the handle from the head.

3. A machine for making frozen confections which comprises a table adapted to receive a mold containing a frozen confection, a rotatable head adapted to support a handle presented towards the confection comprising means resiliently holding an end of the handle and a guide member movable on the head to engage and guide the handle at various positions along its length, and means for causing relative movement between the table and head to cause the handle to be thrust into the confection.

4. A machine for making frozen confections which comprises a table adapted to receive a mold containing a frozen confection, a rotatable head adapted to support a handle presented towards the confection comprising means resiliently holding an end of the handle and a guide member movable on the head to engage and guide the handle at various positions along its length, said guide member being mounted on the head for sliding movement parallel to the length of the handle, means on said guide member adapted to engage the mold to arrest said guide member, and means for causing relative movement between the table and head to cause the handle to be thrust into the confection.

5. A machine for making frozen confections which comprises a table adapted to receive a mold containing a frozen confection, a head adapted to support a plurality of handles, said head being revolvably mounted to enable each handle to be presented to a mold, and means for causing relative movement between the table and head to cause a handle to be thrust into the confection.

6. In a machine for making frozen confections, a head adapted to receive the ends of a plurality of sticks, the other ends of which are to be inserted in said confections, resilient means on the head holding the sticks thereon, a plate slidably mounted on said head for movement parallel to the sticks, and means on said plate through which the sticks extend, said means being adapted to engage said other ends of said sticks and support them while they are being inserted in the confections.

7. In a machine for making frozen confections, a head adapted to receive a plurality of sticks, resilient means on the head holding the sticks thereon, a plate slidably mounted on said head for movement parallel to the sticks, means on said plate through which the sticks extend, said means being adapted to engage said sticks to support them and removable abutment means carried by the plate adapted to engage a mold.

8. In a machine for making frozen confections, a rotatable head having a plurality of operating faces, in each of which it is adapted to receive a plurality of sticks, resilient means on the head holding the sticks thereon, plates slidably mounted on said head for movement parallel to the sticks, guide means through which the sticks extend, and removable abutment means on each plate adapted to engage a mold.

9. In a machine for making frozen confections, a rotatable head having a plurality of outwardly directed plates, a plurality of angles on each plate, straps mounted on the angles forming pockets adapted to receive the ends of a plurality of sticks, and resilient means adapted to secure said sticks within the pockets.

10. In a machine for making frozen confections, a rotatable head having a plurality of outwardly directed plates, a plurality of angles on each plate, straps mounted on the angles forming pockets adapted to receive the ends of a plurality of sticks, resilient means adapted to secure said sticks within the pockets, and means providing guides for the sticks of each plate, slidably mounted on said plate for limited movement parallel to said sticks.

11. A machine for making frozen confections which comprises a table adapted to receive a mold containing a frozen confection, a head adapted to support a plurality of handles, said head being revolvably mounted to enable each handle to be pressed to a mold, and means for causing the table to move towards the head to cause a handle to be thrust into the confection.

12. A machine for making frozen confections which comprises a table adapted to receive a mold containing a frozen confection, a rotatable head adapted to receive a handle presented towards the confection, a guide member movable on the head to engage and guide the handle at various positions along its length, means for causing relative movement between the table and head to cause the handle to be thrust into the confection, and resilient means holding the handle in cooperative relation with the head and guide member during said thrusting.

13. In a machine for making frozen confections, a rotatable head having a plurality of operating faces, each of which is adapted to receive a plurality of sticks, plates slidably mounted on said head for movement parallel to the sticks, guide means on said plates through which the sticks extend, removable abutment means on each plate adapted to engage a mold, and resilient means for holding the sticks in cooperative relation with the head and guide means.

RUDOLPH G. BIRR.